United States Patent [19]

Schmidt et al.

[11] Patent Number: 4,768,945
[45] Date of Patent: Sep. 6, 1988

[54] INJECTION MOLDING NOZZLE HAVING GROUNDED HEATING ELEMENT BRAZED INTO POINTED TIP

[75] Inventors: Harald H. Schmidt; Jobst U. Gellert, both of Georgetown, Canada

[73] Assignee: Mold-Masters Limited, Georgetown, Canada

[21] Appl..No.: 123,910

[22] Filed: Nov. 23, 1987

[30] Foreign Application Priority Data

Oct. 16, 1987 [CA] Canada ................................. 549518

[51] Int. Cl.[4] ............................................ B29C 45/20
[52] U.S. Cl. .................................... 425/549; 219/421; 219/523; 264/328.15; 425/570; 425/572
[58] Field of Search ................ 219/421, 523; 425/547, 425/548, 549, 568, 570, 572; 264/328.15

[56] References Cited

U.S. PATENT DOCUMENTS 4,516,927  5/1985  Yoshida ................................ 425/568
4,688,622  8/1987  Gellert ................................. 164/112
4,704,516  11/1987  Tsutsumi ............................. 219/412

FOREIGN PATENT DOCUMENTS 2164893  4/1986  United Kingdom .

*Primary Examiner*—Jay H. Woo
*Assistant Examiner*—Timothy W. Heitbrink
*Attorney, Agent, or Firm*—Riches, McKenzie & Herbert

[57] ABSTRACT

This invention relates to an improved injection molding nozzle having an integral electrical heating element. The nozzle has an elongated nose portion extending to a forward end from a cylindrical central portion. The heating element is brazed in a spiral channel around a central melt bore in the central portion of the nozzle, and extends into the nose portion to a forward end which is grounded by brazing it in nickel adjacent a high speed steel insert portion at the forward end of the nozzle. This forms a pointed tip at the forward end of the nozzle which is corrosion and wear resistant and can be heated to a predetermined temperature. In alternative embodiments, the forward end of the heating element can be brazed in nickel adjacent the forward end without the high speed steel insert portion and/or the nose portion can be inclined with the forward end of the heating element being grounded adjacent an end gate rather than a separate gate. The mass of the central portion and the elongated tapered shape of the nose portion which permits relatively rapid temperature changes of the melt in the gate area enable the nozzle having a single heating element to be used for temperature assisted gating.

10 Claims, 3 Drawing Sheets

4,768,945

INJECTION MOLDING NOZZLE HAVING GROUNDED HEATING ELEMENT BRAZED INTO POINTED TIP

BACKGROUND OF THE INVENTION

This invention relates to injection molding and more particularly to an improved injection molding nozzle having an integral electrical heating element wherein the forward end of the heating element is brazed into the nose portion to ground it and heat the forward end of the nozzle.

Nozzles with integral heating elements are well known in the art. For example, the applicant's recent Canadian patent application Ser. No. 542,185 entitled "Coated Injection Molding Nozzle and Method" filed July 15, 1987 discloses a nozzle in which the forward end of the heating element extends into the nose portion. It is also known to provide injection molding probes having two heating elements, one of which is welded at the pointed tip to ground it. Examples of this are shown in U.S. Pat. No. 4,516,927 to Yoshida which issued May 14, 1985 and U.K. patient application No. 2,164,893A to Tsutsumi filed Aug. 25, 1985. While these previous probes are used to temperature gate the flow of melt, the fact that the melt flows around each probe between it and the surrounding cooled cavity plate necessitates the use of two heating elements so the main one can be energized continuously to avoid an unacceptable temperature drop in the melt. In the present invention, the melt flows through the heated nozzle and a single heating element can be used to heat both the central portion and the nose portion of the nozzle.

SUMMARY OF THE INVENTION

Accordingly, it is an object of the present invention to at least partially overcome the disadvantages of the prior art by providing a nozzle with a single integral heating element, the forward end of which extends into the nose portion of the nozzle and is brazed in an electrically conductive material to ground it adjacent the forward end of the nozzle.

To this end, in one of its aspects, the invention provides an elongated integral injection molding nozzle having a forward end and a rear end with a central portion having a generally cylindrical outer surface extending between a steel collar portion adjacent the rear end and a nose portion adjacent the forward end, the nose portion having a tapered outer surface leading to the forward end, the nozzle having a melt bore with a first and second portion, the first portion extending centrally from the rear end through the central portion and joining the second portion which extends diagonally to the tapered surface of the nose portion, the nozzle having an electrically insulated heating element integrally brazed in a spiral channel in the cylindrical outer surface of the central portion with a portion extending diagonally into the nose portion to a forward end and a rear end extending out through a radial opening in the collar portion to a cold terminal, the heating element having a resistance wire extending centrally through an electrical insulating material in an outer casing, the outer surface of the central portion and the heating element brazed in the spiral channel therein being covered with a protective coating, the improvement wherein the central resistance wire at the forward end of the heating element is exposed and integrally brazed in an electrically conductive brazing material to ground the heating element adjacent the forward end of the nozzle, whereby the forward end of the nozzle can be heated to a predetermined temperature.

Further objects and advantages of the invention will appear from the following description, taken together with the accompanying drawings.

BRIEF DESCRIPTION OF THE DRAWINGS

FIG. 4 is a sectional view of a portion of an edge gated injection molding system, showing a nozzle according to a second embodiment of the invention.

DETAILED DESCRIPTION OF THE DRAWINGS

Figure 1:
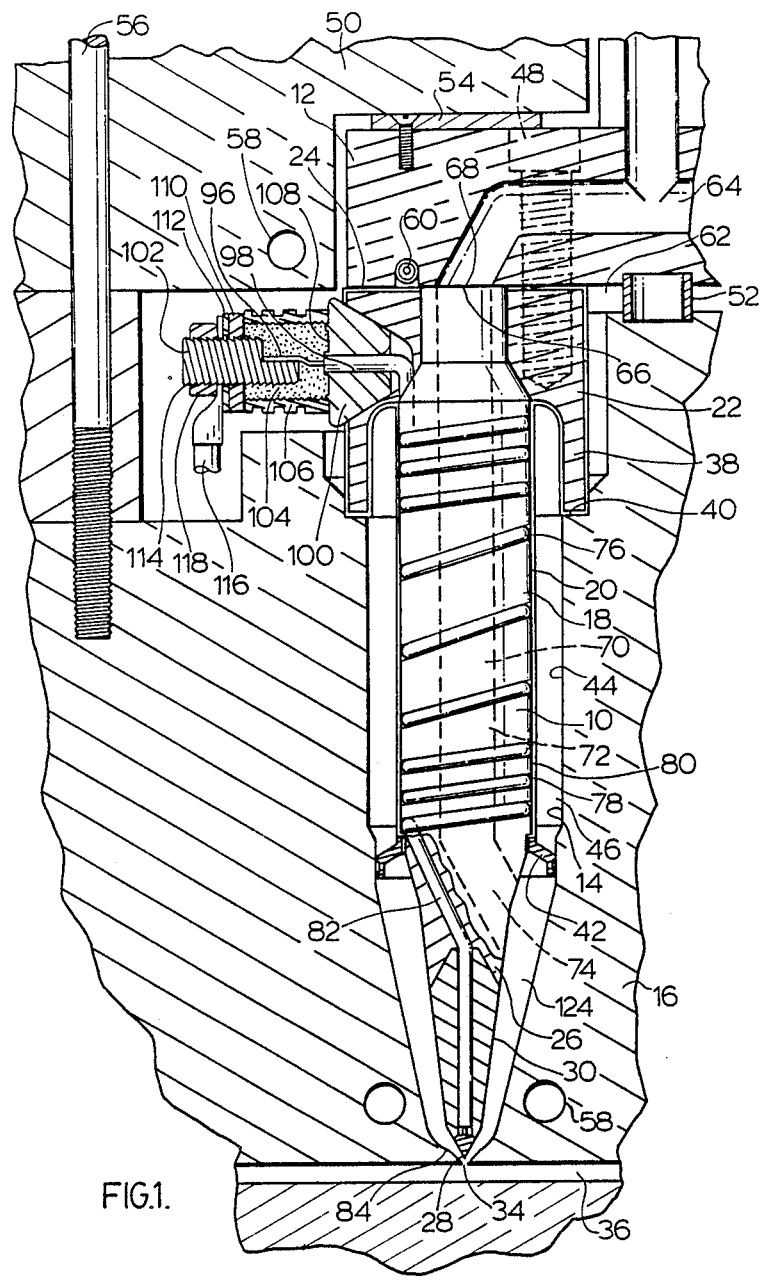
FIG. 1 is a sectional view of a portion of an injection molding system, showing a nozzle according to a preferred embodiment of the invention.
Figure 2:
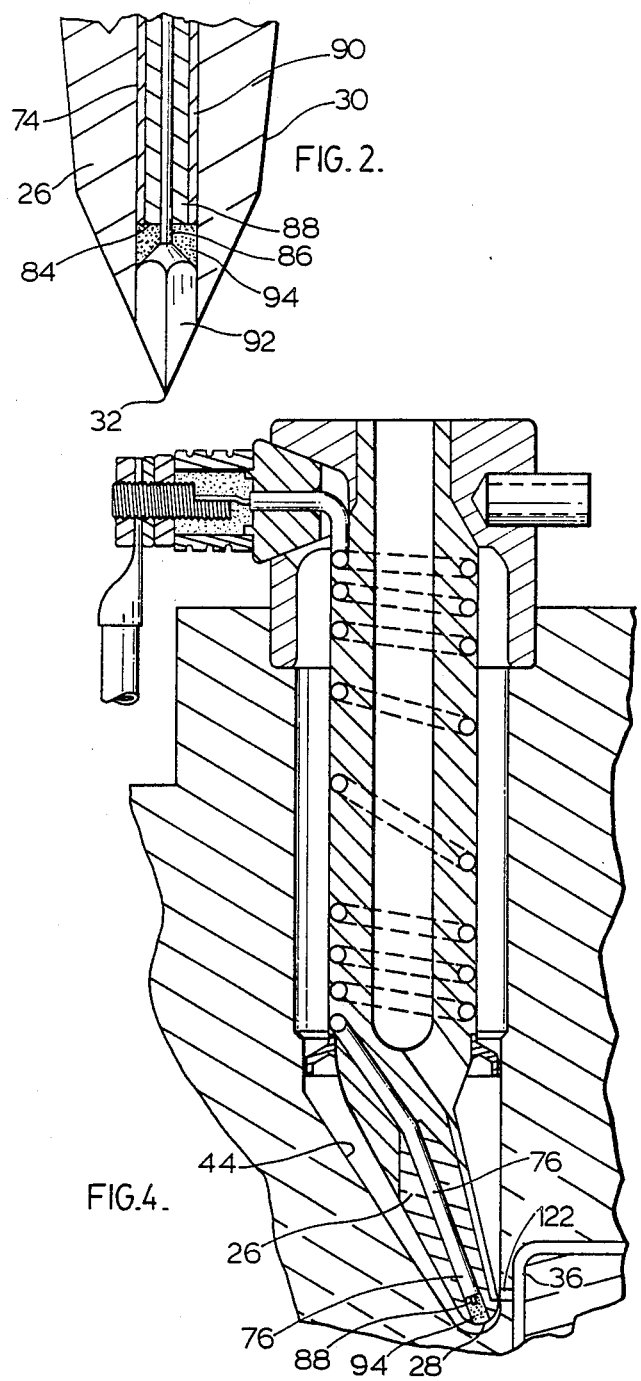
FIG. 2 is an enlarged view showing the pointed tip of the nose portion of the nozzle seen in FIG. 1.

Reference is first made to FIG. 1 which shows a portion of a multi-cavity injection molding system wherein a number of heated nozzles 10 extend from a common elongated heated manifold 12. Each heated nozzle 10 is seated in a well 14 in a cavity plate 16. The nozzle 10 has a steel central portion 18 with a generally cylindrical outer surface 20 extending between a steel collar portion 22 adjacent the rear end 24 and a steel elongated nose portion 26 adjacent the forward end 28. The nose portion 26 has a tapered outer surface 30 which leads to a pointed tip 32 at the forward end 28 which is in alignment with a gate 34 in the cavity plate 16 leading to a cavity 36.

The nozzle 10 is seated in this position in the well 14 by a circumferential insulation flange or bushing 38 which extends from the collar portion 22 and sits on a circumferential shoulder 40. The nozzle is accurately located with the pointed tip 32 in alignment with the gate 34 by a circumferential sealing and locating flange 42 which extends between the central portion 18 and the nose portion 26 to abut against the inner surface 44 of the well 14. As can be seen, other than the insulation flange 38 and the sealing and locating flange 42, the heated nozzle 10 is separated from the surrounding cooled cavity plate 16 by an insulative air space 46.

Each nozzle 10 is fastened by bolts 48 to the manifold 12 which is secured between the cavity plate 16 and a back plate 50 by a locating ring 52 and a titanium pressure pad 54. The back plate 50 is held in place by bolts 56 which extend into the cavity plate 16. The back plate 50 and the cavity plate 16 are cooled by pumping cooling water through cooling conduits 58. The manifold 12 is heated by an electric heating element 60 which is cast into it as described in the applicant's U.S. Pat. No. 4,688,622 entitled "Injection Molding Manifold Member and Method of Manufacture" which issued Aug. 25, 1987. The locating ring 52 provides another insulative air space 62 between the heated manifold 12 and the cooled cavity plate 16.

The manifold 12 has a melt passage 64 which branches from a common inlet to a number of outlets 66 on the opposite side. Each outlet is in alignment with an inlet 68 to a melt bore 70 extending through one of the nozzles. Each melt bore 70 has a central portion 72 extending from the rear end 24 and a diagonal portion 74, which connects to the tapered surface 30 of the nose portion 26.

The nozzle 10 is heated by an electrically insulated heating element 76 which is integrally brazed in a spiral channel 78 in the cylindrical outer surface 20 of the central portion 18. The heating element 76 in the channel 78 and the outer surface 20 are covered with a protective nickel coating 80 as described in the applicant's Canadian patent application Ser. No. 542,185, mentioned above. The heating element 76 also has a portion 82 which extends diagonally into the nose portion 26 of the nozzle 10 beneath the circumferential sealing and locating flange 42 and then centrally to a forward end 84 adjacent the pointed tip 32. As clearly seen in FIG. 3, the low voltage single wire heating element 76 has a nickel-chrome resistance wire 86 extending centrally through a refractory powder electrical insulating material 88 such as magnesium oxide inside a steel casing 90. At the forward end 84 of the heating element 76, the exposed resistance wire 86 projects from the insulating material 88 and casing 90 to a high speed steel insert portion 92 which forms the pointed tip 32. The exposed wire 86 and the high speed steel insert portion 92 are integrally brazed in nickel 94 which grounds the heating element 76 adjacent the pointed tip. This provides a pointed tip which is corrosion and wear resistant and which can be heated by the heating element 76 to a predetermined temperature. The heating element 76 has a rear end 96 which extends out through a radial opening 98 in a plug 100 received in the collar portion 22. The resistance wire 86 at the rear end 96 of the heating element 76 connects to a threaded stud 102 surrounded by ceramic insulation 104 inside a cylindrical steel sleeve 106 which is attached to the surface 108 of the plug 100. A ceramic washer 110 and a steel washer 112 are received on the projecting stud 102 to form a cold terminal 114 which receives an external power lead 116 which is held securely in place by nut 118. Thus, electrical current from the lead 116 flows through the heating element 76 to the ground at the forward end 84. This heats the nozzle 10 throughout both the central portion 18 and the nose portion 26 so that the pointed tip 32 can be heated to a predetermined temperature.

Figure 3:
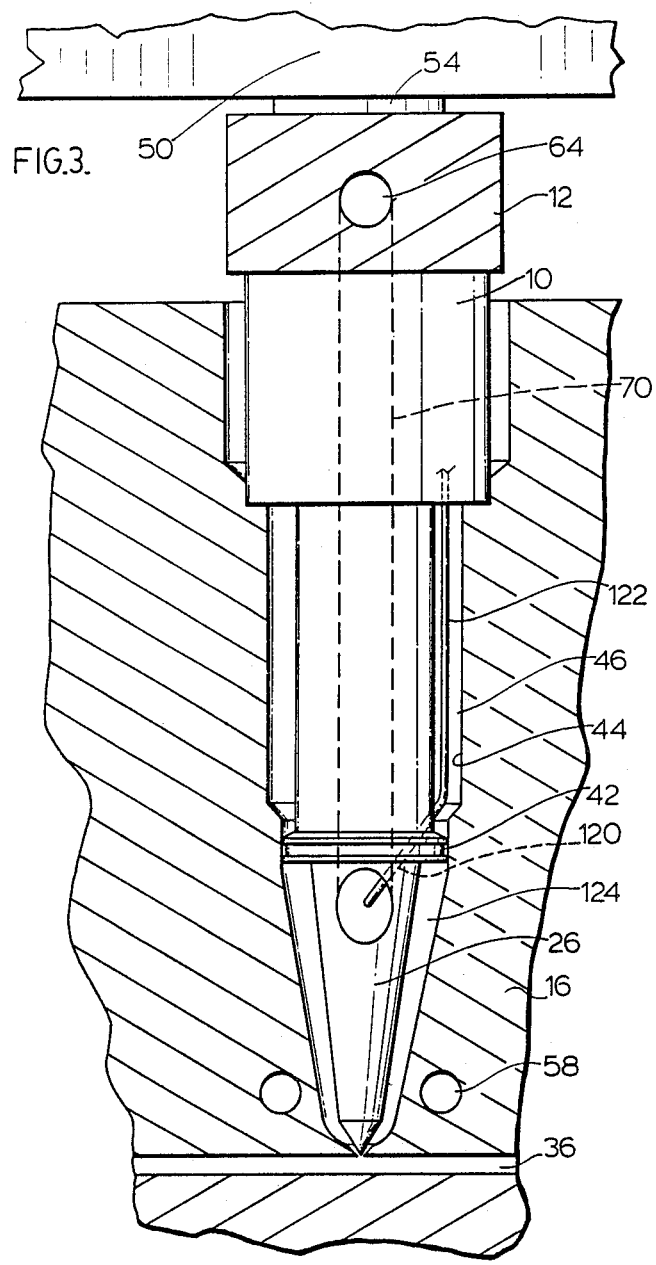
FIG. 3 is a sectional view of the nozzle seen in FIG. 1 showing the thermocouple hole.

The nozzle 10 has a thermocouple hole 120 which is drilled diagonally from the outer surface 20 of the central portion 18 to extend beneath the sealing and locating flange 42 into the nose portion 26. As seen in FIG. 3, this hole 120 removably receives a thermocouple 122 which extends through the air space 46 to measure the temperature of the nose portion 26 during use.

In use, after the injection molding system has been assembled as shown in FIG. 1 and described above, electrical power is applied through the lead 116 to the heating element 76 in each nozzle 10 and to the heating element 60 in the manifold 12 to heat the nozzle 10 and the manifold to a predetermined operating temperature. Pressurized melt from a molding machine (not shown) is then introduced into the melt passage 64 in the manifold 12 according to a predetermined cycle in a conventional manner. The pressurized melt flows through the melt bore 70 in each nozzle 10 into the space 124 surrounding the tapered surface 30 of the nose portion 26, and then through the gate 34 and fills the cavity 36. The space 124 remains filled with melt, a portion of which solidifies adjacent the cooled cavity plate 16, and the sealing and locating flange 42 prevents it escaping into the insulative air space 46. After the cavities are filled, injection pressure is held momentarily to pack and then released. After a short cooling period, the mold is opened to eject the molded products. After, ejection, the mold is closed and injection pressure is reapplied to refill the cavity. This cycle is continuously repeated with a frequency dependent on the size and shape of the cavities and the type of material being molded.

In an alternative use of the system when a larger diameter gate is desired and/or an easily stringing crystaline material is being molded, temperature assisted gating can be employed. This involves controlling the flow of power to the leads 116 to the heating elements 76 in a co-ordinated cycle so that no heat is provided to the nozzles for a short period of time before and when the mold is opened. The elongated shape of each tapered nose portion 26 surrounded by the cooled cavity plate 16 results in a temperature drop in the gate area of approximately 7°-8° C./second. For most crystaline materials, a temperature drop of 20°-25° C. is sufficient to freeze the gate prior to ejection. Right after the mold is opened, electrical power is reapplied to heat the melt in the gate area to reopen the gate when injection pressure is reapplied after injection. While heat is also lost from the central portion 18 of the nozzle during the injection period, the air gap insulated steel mass surrounding the melt bore 70 retains sufficient heat so that no solidification occurs. It will be apparent that the shape and size of the nozzle and the periods of the molding cycle are critical to the success of this type of gating using only a single heating element. The central portion 18 of the nozzle 10 must have sufficient mass to retain heat, while the nose portion 26 must be sufficiently tapered and elongated and the forward end 84 of the heating element 76 brazed close enough to the pointed tip 32 that gate temperature can be lowered and raised relatively quickly.

FIG. 4 illustrates a second embodiment of the nozzle according to the invention. As many of the elements are identical to those of the first embodiment described above, elements common to both embodiments are described and illustrated using the same reference numbers. In this embodiment, the tapered nose portion 26 of the nozzle 10 and the surrounding surface 44 of the well 14 are inclined to one side, and the melt flows into the cavity 36 through an edge gate 122 rather than a center gate. However, as can clearly be seen, the forward end 84 of the heating element 76 has the central resistance wire 86 exposed and integrally brazed in nickel 94 to ground it adjacent the forward end 28 and the gate 34. This allows the forward end 28 adjacent the gate to be heated to a predetermined temperature, as described above. The use and operation of this embodiment in either the conventional gating or temperature assisted gating modes is essentially the same as that described above and need not be repeated.

While the description of the nozzle and its use have been given with respect to preferred embodiments, it is not to be construed in a limiting sense. Variations and modifications will occur to those skilled in the art. For instance, the exposed resistance wire 86 at the forward end 84 of the heating element can be brazed in nickel to form a pointed tip 32 without the use of a high speed steel insert portion 92. This provides the nozzle 10 with a pointed tip which is corrosion and wear resistant and can be heated to a predetermined temperature as described above Reference is made to the appended claims for a definition of the invention.

What we claim is:

1. In an elongated integral injection molding nozzle having a forward end and a rear end with a central portion having a generally cylindrical outer surface extending between a steel collar portion adjacent the rear end and a nose portion adjacent the forward end, the nose portion having a tapered outer surface leading to the forward end, the nozzle having a melt bore with first and second portions, the first portion extending centrally from the rear end through the central portion and joining the second portion which extends diagonally to the tapered surface of the nose portion, the nozzle having an electrically insulated heating element with a rear end and a forward end, the heating element having one portion extending diagonally into the nose portion to a forward end of the heating element and another portion integrally brazed in a spiral channel in the cylindrical outer surface of the central portion, the rear end of the heating element extending out through a radial opening in the collar portion to a cold terminal, the heating element having a resistance wire extending centrally through an electrical insulating material in an outer casing, the outer surface of the central portion and the heating element brazed in the spiral channel therein being covered with a protective coating, the improvement wherein:

the central resistance wire at the forward end of the heating element is exposed and integrally brazed in an electrically conductive brazing material to ground the heating element adjacent the forward end of the nozzle, whereby the forward end of the nozzle can be heated to a predetermined temperature.

2. An injection molding nozzle as claimed in claim 1 wherein the brazing material is nickel.

3. An injection molding nozzle as claimed in claim 2 wherein the nickel brazing material forms a corrosion resistant central pointed tip which can be heated to a predetermined temperature.

4. An injection molding nozzle as claimed in claim 2 wherein a high speed steel insert portion is integrally brazed into the nose portion of the nozzle to form a pointed tip, and the exposed resistance wire at the forward end of the heating element is brazed adjacent the high speed steel insert portion to ground the heating element adjacent the pointed tip, whereby the corrosion resistant pointed tip can be heated to a predetermined temperature.

5. An injection molding nozzle as claimed in claim 4 wherein the heating element extends diagonally into the nose portion to a central position and then extends centrally to the forward end adjacent the high speed steel insert portion.

6. An injection molding nozzle as claimed in claim 5 wherein the central heating wire projects from the surrounding insulating material and casing at the forward end of the heating element, the projecting heating wire and the adjacent high speed steel insert portion being integrally brazed in nickel, thereby grounding the heating element adjacent the pointed tip.

7. An injection molding nozzle as claimed in claim 6 wherein the nozzle has an outwardly projecting circumferential sealing and locating flange between the central portion and the elongated nose portion.

8. An injection molding nozzle as claimed in claim 7 wherein the nozzle has a thermocouple hole extending diagonally beneath the sealing and locating flange from the surface of the central portion into the elongated nose portion.

9. An injection molding nozzle as claimed in claim 7 wherein the collar portion has a circumferential insulation flange which is larger in diameter than the outer surface of the central portion, the flange extending towards the forward end of the nozzle around the outer surface of the central portion to provide an insulative air space therebetween.

10. An injection molding nozzle as claimed in claim 1 wherein the central portion of the nozzle has sufficient mass and the tapered nose portion of the nozzle is sufficiently elongated whereby controlling electrical power to the heating element with the forward end integrally brazed adjacent the forward end changes the melt temperature in the gate area sufficiently rapidly to provide temperature assisted gating.

* * * * *